United States Patent
Nakagawa et al.

(10) Patent No.: US 10,131,231 B2
(45) Date of Patent: Nov. 20, 2018

(54) VEHICLE POWER TRANSMITTING AND RECEIVING CONTROL DEVICE THAT PERFORMS ABNORMALITY DETERMINATION OF BIDIRECTIONAL COMMUNICATION

(71) Applicant: TOYOTA JIDOSHA KABUSHIKI KAISHA, Toyota-shi, Aichi-ken (JP)

(72) Inventors: Nobuyuki Nakagawa, Miyoshi (JP); Ryo Tanaka, Kyotanabe (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 33 days.

(21) Appl. No.: 15/119,597

(22) PCT Filed: Jan. 29, 2015

(86) PCT No.: PCT/JP2015/052567
§ 371 (c)(1),
(2) Date: Aug. 17, 2016

(87) PCT Pub. No.: WO2015/133210
PCT Pub. Date: Sep. 11, 2015

(65) Prior Publication Data
US 2017/0057358 A1    Mar. 2, 2017

(30) Foreign Application Priority Data
Mar. 7, 2014  (JP) ................................. 2014-045206

(51) Int. Cl.
*H02J 7/00*      (2006.01)
*B60L 3/04*      (2006.01)
(Continued)

(52) U.S. Cl.
CPC ............. *B60L 3/04* (2013.01); *B60L 11/1838* (2013.01); *B60L 11/1842* (2013.01);
(Continued)

(58) Field of Classification Search
CPC .... B60L 3/04; B60L 11/1838; B60L 11/1842; B60L 11/1846; B60L 2230/16;
(Continued)

(56) References Cited

U.S. PATENT DOCUMENTS

2009/0222143 A1* 9/2009 Kempton ............ B60L 11/1824
                                                        700/291
2013/0229143 A1* 9/2013 Chou .................... H02J 7/0004
                                                        320/107
(Continued)

FOREIGN PATENT DOCUMENTS

EP        2 752 331 A1    7/2014
JP        2013-48518      3/2013
(Continued)

*Primary Examiner* — Nathaniel Pelton
(74) *Attorney, Agent, or Firm* — Finnegan, Henderson, Farabow, Garrett & Dunner, LLP

(57) ABSTRACT

A vehicle power transmitting and receiving control device, applied to a vehicle including an on-vehicle power storage device that transmits and receives power to and from an external power supply device and a communication unit that performs bidirectional communication to transmit and receive the power, includes a determination unit that determines, when an abnormality occurs in the bidirectional communication performed before transmitting and receiving the power, whether or not to continue the bidirectional communication in accordance with a content of the abnormality.

18 Claims, 10 Drawing Sheets

(51) Int. Cl.
*B60L 11/18* (2006.01)
*H02J 7/02* (2016.01)
*H04B 3/00* (2006.01)
*H04B 3/54* (2006.01)

(52) U.S. Cl.
CPC ......... *B60L 11/1846* (2013.01); *H02J 7/0004* (2013.01); *H02J 7/0021* (2013.01); *H02J 7/02* (2013.01); *H04B 3/00* (2013.01); *H04B 3/542* (2013.01); *B60L 2230/16* (2013.01); *H02J 2007/0096* (2013.01); *H04B 2203/5416* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(58) Field of Classification Search
CPC .......... H02J 7/0004; H02J 7/0021; H02J 7/02; H02J 2007/0096; H04B 3/00; H04B 3/542; H04B 2203/5416

USPC ....................................................... 320/109
See application file for complete search history.

(56) References Cited

U.S. PATENT DOCUMENTS

2015/0023438 A1  1/2015  Takata et al.
2015/0188739 A1* 7/2015  Igarashi ................ H04B 3/548
                                                701/22

FOREIGN PATENT DOCUMENTS

JP         2013-187968       9/2013
WO    WO 2013/129038 A1    9/2013

* cited by examiner $$D = \frac{TH}{TL+TH} \times 100 \ (\%)$$

VEHICLE POWER TRANSMITTING AND RECEIVING CONTROL DEVICE THAT PERFORMS ABNORMALITY DETERMINATION OF BIDIRECTIONAL COMMUNICATION

CROSS-REFERENCE TO RELATED APPLICATIONS

This application is a national phase application of International Application No. PCT/JP2015/052567, filed Jan. 29, 2015, and claims the priority of Japanese Application No. 2014-045206, filed Mar. 7, 2014, the content of both of which is incorporated herein by reference.

TECHNICAL FIELD

The present invention relates to a vehicle power transmitting and receiving control device applied to a vehicle including an on-vehicle power storage device that transmits and receives power to and from an external power supply device and a communication unit that performs bidirectional communication to transmit and receive the power.

BACKGROUND ART

To enable charging of a battery in a vehicle from the outside, in addition to a charge cable, a communication line used to transmit a control pilot signal (CPLT signal) connects the vehicle and an external power supply device. More specifically, an upper limit value of current that can be supplied from the external power supply device is expressed by a time ratio of the time of logic H to a cycle of logic H and logic L of the CPLT signal, and the upper limit value is notified to the vehicle. This allows the vehicle to perform charge control so that the charge current value is less than or equal to the upper limit value.

Further, a high-frequency signal having a higher frequency than the CPRT signal is superposed on the CPLT signal to perform inband communication that transmits and receives more information than that contained in the CPLT signal (Patent Document 1). In addition, the inband communication is performed with the time ratio of the CPLT signal fixed at 5%. More specifically, when the time ratio of the CPLT signal is 5%, the time ratio is not a value that expresses the upper limit value of current that can be supplied. Rather, the time ratio is a value set in particular to perform the inband communication.

Patent Document 1: International Publication No. 2013/129038

SUMMARY OF THE INVENTION

Patent Document 1 does not disclose a fail-safe process when an abnormality occurs in the inband communication. Thus, when an abnormality occurs in inband communication may cause situations, the continuation of inband communication may be impeded, and the initiation of a charging process or the like may be hindered.

Accordingly, it is an object of the present invention to provide a vehicle power transmitting and receiving control device that is applied to a vehicle including an on-vehicle power storage device that transmits and receives power to and from an external power supply device and a communication unit that performs bidirectional communication to transmit and receive power in which the vehicle power transmitting and receiving control device is capable of quickly overcoming an abnormality that occurs in bidirectional communication.

A vehicle power transmitting and receiving control device according to one aspect of the present invention includes an on-vehicle power storage device that transmits and receives power to and from an external power supply device and a communication unit that performs bidirectional communication to transmit and receive the power. The bidirectional communication includes communication for preparing for the transmission and reception of the power before transmitting and receiving the power. The vehicle power transmitting and receiving control device further includes a determination unit that determines, when an abnormality occurs in the bidirectional communication performed before transmitting and receiving the power, whether or not to continue the bidirectional communication in accordance with a content of the abnormality.

The processes performed in accordance with the content of the communication are not necessarily required to perform transmission and reception of power. When the bidirectional communication performed prior to transmission and reception of power is interrupted, the probability that power cannot be transmitted and received is high. Thus, if the communication is always terminated when a data abnormality occurs, this may hinder transmission and reception of power even though transmission and reception of power can be actually performed. The above device increases the probability that power can be transmitted and received by determining whether or not to continue the communication in accordance with the content of an abnormality.

In one embodiment, the determination unit determines to continue the communication on the condition that the content of the abnormality allows for transmission and reception of the power.

Even when an abnormality that allows for transmission and reception of power occurs, transmission and reception of power through the bidirectional communication cannot be performed when the bidirectional communication is stopped. The above device increases the probability that power can be transmitted and received by continuing the bidirectional communication on the condition that the abnormality allows for transmission and reception of power.

In one embodiment, the vehicle power transmitting and receiving control device includes an execution unit that performs transmission and reception of the power within a range in which a service restriction is imposed in accordance with the content of the abnormality of the communication when the determination unit determines to continue the communication.

In one embodiment, the determination unit determines not to continue the communication when the content of the abnormality hinders transmission and reception of the power.

When an abnormality that hinders transmission and reception of power occurs, transmission and reception of power cannot be started through the bidirectional communication by continuing the bidirectional communication. The above device determines not to continue the bidirectional communication when an abnormality that hinders transmission and reception of power occurs. In this case, transmission and reception of power through the bidirectional communication is not performed. This limits decrease in reliability of the device that relates to transmission and reception of power in a favorable manner.

In one embodiment, the vehicle power transmitting and receiving control device includes an acquisition unit that acquires information of a current value output from the external power supply device when the external power supply device supplies power to the on-vehicle power storage device. The information of the current value is transmitted from the external power supply device to the acquisition unit through a communication line. The bidirectional communication is performed through the communication line. The vehicle power transmitting and receiving control device further includes a termination processor that performs a process for having the external power supply device terminate the bidirectional communication when the determination unit determines not to continue the bidirectional communication while performing the bidirectional communication to charge the on-vehicle power storage device with the power supplied from the external power supply device. In addition, the vehicle power transmitting and receiving control device includes a charging processor that charges the on-vehicle power storage device based on the information of the current value acquired by the acquisition unit after the termination processor performs the termination process.

When bidirectional communication is performed to charge the on-vehicle power storage device and an abnormality occurs in the communication, charging may be performed using the information of the current value without the bidirectional communication. It is desired that the bidirectional communication be terminated when quickly shifting to a state in which the information of the current value can be acquired. Thus, the above device uses the termination processor to terminate the bidirectional communication. When the on-vehicle power storage device is charged based on the current value acquired by the acquisition unit, the on-vehicle power storage device can be charged based on the information acquired by the acquisition unit without the bidirectional communication.

A vehicle power transmitting and receiving control device according to another aspect of the present invention includes an on-vehicle power storage device that transmits and receives power to and from an external power supply device and a communication unit that performs bidirectional communication for transmitting and receiving the power, and an acquisition unit that acquires information of a current value output from the external power supply device when power is supplied from the external power supply device to the on-vehicle power storage device. The information of the current value is transmitted from the external power supply device to the acquisition unit through a communication line. The bidirectional communication is performed through the communication line and includes communication for preparing for the transmission and reception of the power before transmitting and receiving the power. The vehicle power transmitting and receiving control device further includes a termination processor that performs a process for having the external power supply device terminate the bidirectional communication under the condition that an abnormality occurs in the bidirectional communication performed before transmitting and receiving the power. In addition, the vehicle power transmitting and receiving control device includes a charging processor that charges the on-vehicle power storage device based on the information of the current value acquired by the acquisition unit after the processing performed by the termination processor.

Even when an abnormality occurs in the bidirectional communication, charging may be performed using the information of the current value without the bidirectional communication. When quickly shifting to a state in which the information of the current value can be acquired, it is desired that the bidirectional communication be terminated. The above device uses the termination processor to terminate the bidirectional communication. When the on-vehicle power storage device is charged based on the current value acquired by the acquisition unit, the on-vehicle power storage device can be charged based on the information acquired by the acquisition unit without the bidirectional communication. This quickly overcomes a situation in which the on-vehicle power storage device cannot be charged when an abnormality occurs in the bidirectional communication.

In one embodiment, the termination processor performs a voltage change operation to change voltage of the communication line to a voltage that differs from when the bidirectional communication is performed normally and then performs a process for stopping the voltage change operation.

When the voltage of the communication line is changed to a voltage that differs from when the bidirectional communication is performed normally, the external power supply device may determine that the bidirectional communication cannot be performed and then stop the bidirectional communication. Subsequently, when the voltage of the communication line returns to a normal voltage, the external power supply device may re-perform the communication from the beginning. It may be easier for the bidirectional communication to shift to a state in which the information of the current value is output before the bidirectional communication is started than when the bidirectional communication is being performed. Thus, the above device performs the voltage change operation to shift to a process performed prior to the bidirectional communication and easily shift to a state in which the information of the current value is output.

In one embodiment, the information of the current value is expressed by a time ratio of a time of logic H to a cycle time including a period of logic H and a period of logic L in a logic signal in which logic H and logic L appear alternately. The bidirectional communication is performed by superposing a high-frequency signal on the logic signal when the time ratio becomes a predetermined ratio. The vehicle power transmitting and receiving control device further includes a waiting processor that waits without performing the bidirectional communication when the logic signal is transmitted from the external power supply device and the time ratio of the logic signal is the predetermined ratio after the termination processor stops the voltage change operation. When the time ratio is the predetermined ratio, the logic signal does not include the information of the current value. The charging processor starts to charge the on-vehicle power storage device under the condition that the information of the current value is transmitted from the external power supply device as a result of the waiting of the waiting processor.

The state in which the time ratio of a logic signal in which logic H and logic L appear alternately becomes a predetermined ratio is originally a state that urges for the bidirectional communication. In this case, the above device does not start the bidirectional communication so that the external power storage device recognizes that the bidirectional communication is not performed. Consequently, the above device urges the logic signal to be changed to a signal that uses the time ratio to express the information of the current value.

In one embodiment, the information of the current value is expressed by a time ratio of a time of logic H to a cycle time including a period of logic H and a period of logic L in a logic signal in which logic H and logic L appear alternately. The bidirectional communication is performed by superposing a high-frequency signal on the logic signal when the time ratio becomes a predetermined ratio. The vehicle power transmitting and receiving control device further includes an urging unit that urges for transmission of the logic signal when the logic signal is not transmitted after the termination processor stops the voltage change operation.

In the above device, even when the output of the logic signal is stopped, the process of the termination processor resumes the output of the logic signal.

In one embodiment, the termination processor performs a process, as the termination process, for notifying the external power supply device using the bidirectional communication that the bidirectional communication will be terminated.

The above device notifies the external power supply device using the bidirectional communication that the bidirectional communication will be terminated. This allows the external power supply device to quickly terminate the bidirectional communication.

In one embodiment, the bidirectional communication transmits a request signal from the communication unit and then transmits a response signal from the external power supply device. The termination processor performs a process, as the termination process, for stopping transmission of the request signal.

The above device transmits a request signal so that the external power supply device determines that an abnormality occurs in communication. This allows the external power supply device to terminate the bidirectional communication.

In one embodiment, the bidirectional communication transmits a request signal from the communication unit to transmit a response signal from the external power supply device. The termination processor performs a process, as the termination process, for transmitting an abnormal signal as the request signal.

The above device transmits an abnormal signal as a request signal so that the external power supply device determines that an abnormality occurs in communication. This allows the external power supply device to terminate the bidirectional communication.

In one embodiment, the information of the current value is expressed by a time ratio of a time of logic H to a cycle time including a period of logic H and a period of logic L in a logic signal in which logic H and logic L appear alternately. The bidirectional communication is performed by superposing a high-frequency signal on the logic signal when the time ratio becomes a predetermined ratio. The vehicle power transmitting and receiving control device further includes an urging unit that urges for transmission of the logic signal under the condition that the logic signal is not transmitted to the communication line after the termination processor performs the termination process.

The above device terminates the bidirectional communication and then stops transmitting a logic signal. This urges for the transmission. Thus, the transmission of a logic signal is resumed, it is possible to shift a state prior to the bidirectional communication. This facilitates shifting to a state in which the information of the current value is expressed by the time ratio.

In one embodiment, the information of the current value is expressed by a time ratio of a time of logic H to a cycle time including a period of logic H and a period of logic L in a logic signal in which logic H and logic L appear alternately. The bidirectional communication is performed by superposing a high-frequency signal on the logic signal when the time ratio becomes a predetermined ratio. When the time ratio becomes the predetermined ratio, the logic signal does not include the information of the current value. The vehicle power transmitting and receiving control device further includes a waiting processor that waits without performing the bidirectional communication when the external power supply device transmits the logic signal and the time ratio of the logic signal is the predetermined time ratio.

The state in which the time ratio of the logic signal is a predetermined ratio is originally a state that urges for the bidirectional communication. In this case, the above device does not start the bidirectional communication so that the external power storage device recognizes that the bidirectional communication is not performed. Consequently, the above device urges the logic signal to be changed to a signal that uses the time ratio to express the information of the current value.

DESCRIPTION OF THE EMBODIMENTS

First Embodiment

A first embodiment of a vehicle power transmitting and receiving control device will now be described with reference to the drawings.

Figure 1:
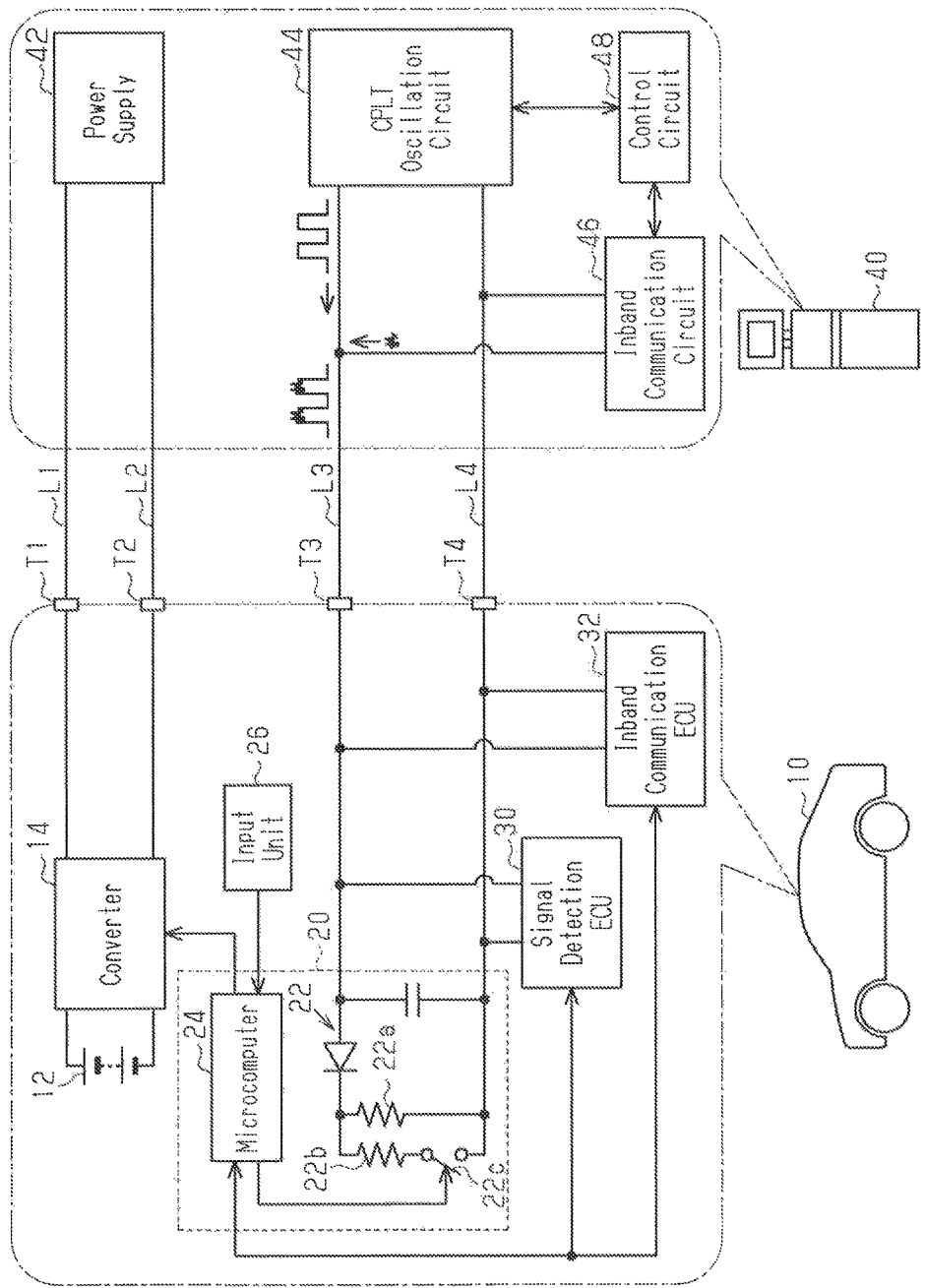
FIG. 1 is a diagram showing the system configuration of a first embodiment.

FIG. 1 shows the system configuration of the first embodiment. A vehicle 10 includes a battery 12 serving as an on-vehicle power storage device. The battery 12 is a rechargeable battery such as a lithium-ion rechargeable battery. A converter 14 serving as a power conversion circuit is connected to the battery 12. The converter 14 is used to charge the battery 12 with power that is supplied from the outside and output the stored electric charge of the battery 12 to the outside.

An external power supply device 40 includes a power supply 42 that transmits and receives power to and from the converter 14 of the vehicle 10. The converter 14 of the vehicle 10 and the power supply 42 of the external power supply device 40 are connectable by power transmission lines L1 and L2. More specifically, the vehicle 10 includes terminals T1 and T2, and the power transmission lines L1 and L2 are connected to the terminals T1 and T2, respectively.

The vehicle 10 includes a CPLT reception circuit 22 serving as a circuit that performs communication to transmit and receive power to and from the external power supply device 40. The external power supply device 40 includes a CPLT oscillation circuit 44 that transmits a CPLT signal. The CPLT oscillation circuit 44 is connectable to the CPLT reception circuit 22 by communication lines L3 and L4. More specifically, the vehicle 10 includes terminals T3 and T4, and the communication lines L3 and L4 are connected to the terminals T3 and T4, respectively. When the communication lines L3 and L4 are connected to the terminals T3 and T4, a CPLT signal that cyclically repeats logic H and logic L is transmittable from the CPLT oscillation circuit 44 to the CPLT reception circuit 22. The communication line L4 is used to set a reference potential. Thus, logic H and logic L of a CPLT signal are defined by the potential difference of the communication line L3 from the communication line L4 (hereinafter referred to as voltage of communication line L3).

The CPLT reception circuit 22 changes the voltage of the communication line L3 in accordance with the progress of a process for transmitting and receiving power. More specifically, the CPLT reception circuit 22 includes a resistor 22a, which connects the communication lines L3 and L4, and a series connector of a resistor 22b and a switching element 22c. The switching element 22c is basically open before the communication lines L3 and L4 are connected to the terminals T3 and T4.

In the first embodiment, the communication between the vehicle 10 and the external power supply device 40 includes communication using a CPLT signal and inband communication using a high-frequency signal superposed on a CPLT signal. To perform inband communication, the vehicle 10 includes an inband communication ECU 32 serving as a communication unit, and the external power supply device 40 includes an inband communication circuit 46. The inband communication ECU 32 and the inband communication circuit 46 are connected to the communication lines L3 and L4.

The vehicle 10 includes a microcomputer 24, an input unit 26, and a signal detection ECU 30. The microcomputer 24 operates the CPLT reception circuit 22 and the converter 14. The input unit 26 receives an instruction from a user and transmits the instruction to the microcomputer 24. The signal detection ECU 30 detects a time ratio D of the time of logic H to a cycle of logic H and logic L of a CPLT signal based on the voltage of the communication line L3. In the first embodiment, the CPLT reception circuit 22 and the microcomputer 24 are formed on a single substrate as a charge control ECU 20.

The external power supply device 40 includes a control circuit 48 that operates the CPLT oscillation circuit 44 and the inband communication circuit 46.

A process for changing the voltage of the communication line L3 in accordance with the progress of a charging process using the microcomputer 24 will now be described with reference to FIG. 2.

Figure 2:
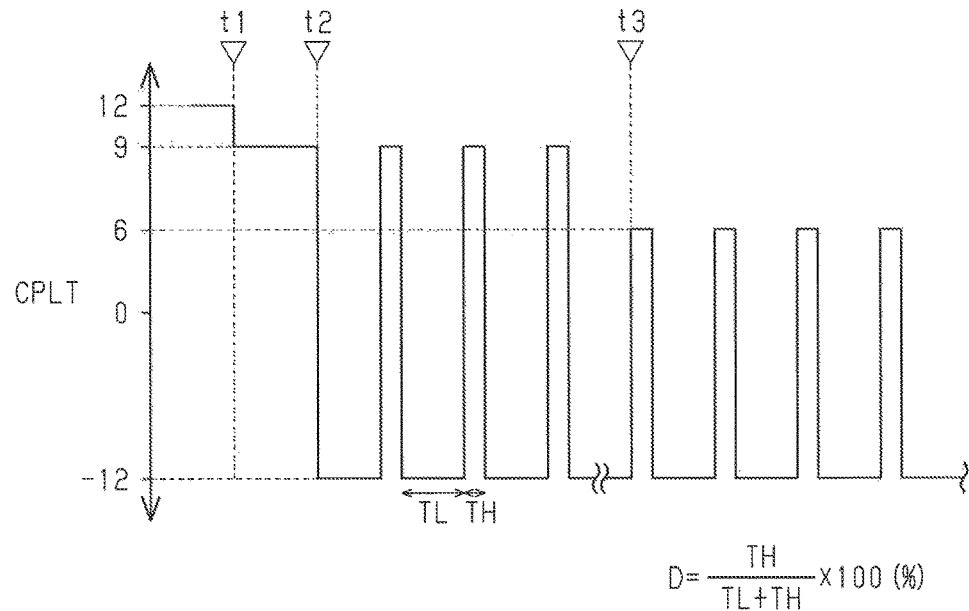
FIG. 2 is a time chart of a CPLT signal.

FIG. 2 shows a state in which the communication lines L3 and L4 are not connected to the terminals T3 and T4 before time t1. In this case, the voltage of the communication line L3 is 12 V, which is the maximum value. At time t1, when the communication lines L3 and L4 are connected to the terminals T3 and T4, the voltages of the communication lines L3 and L4 decrease to 9 V, which is an intermediate value. Before time t1, during which the communication lines L3 and L4 are connected to the terminals T3 and T4, a high-impedance state is produced between the communication lines L3 and L4. At time t1, since the switching element 22c is open, the voltage of the communication line L3 is a divided voltage value of the resistor 22a and an internal resistance of the CPLT oscillation circuit 44. Thus, after t1, the voltage value of the communication line L3 decreases.

The control circuit 48 of the external power supply device 40 detects that the communication lines L3 and L4 are connected when the voltage of the communication line L3 decreases and then has the CPLT oscillation circuit 44 output a CPLT signal in which the voltage of logic H is 9 V and the voltage of logic L is −12 V (time t2).

At time t3, to prepare vehicle 10 for charging of the battery 12, the microcomputer 24 closes the switching element 22c of the CPLT reception circuit 22. In this case, logic H of the CPLT signal becomes 6 V, which is the minimum value. This is because the voltage of the communication line L3 is a divided voltage value of the resistance of the series connector of the resistor 22a and the resistor 22b and the internal resistance of the CPLT oscillation circuit 44.

Figure 3:
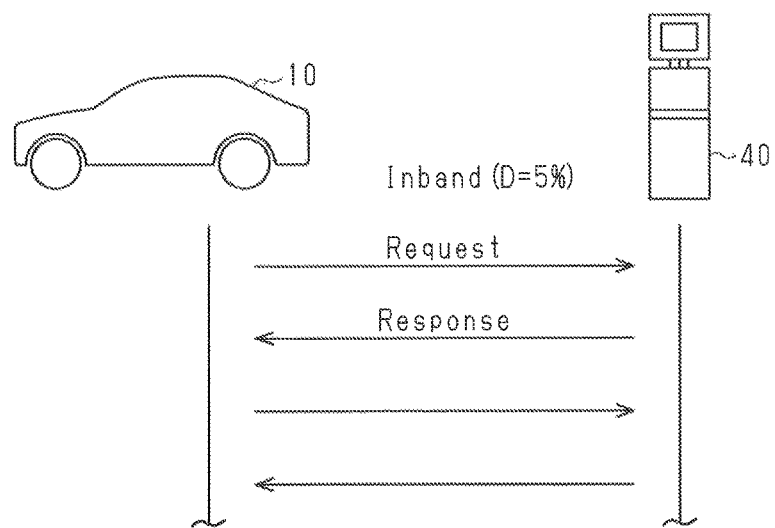
FIG. 3 is a diagram showing inband communication.

Charging is prepared through inband communication using a high-frequency signal superposed on a CPLT signal as described above. More specifically, inband communication is performed when the ratio (time ratio D) of the time of logic H to one cycle time of logic H and logic L of a CPLT signal is 5% as shown in FIG. 3. In particular, when the communication lines L3 and L4 are connected, the external power supply device 40 that is capable of performing inband communication first sets the time ratio of a CPLT signal to 5%. Further, inband communication is performed when a request signal is transmitted from the inband communication ECU 32 of the vehicle 10 to the inband communication circuit 46 of the external power supply device 40 and a response signal is transmitted by the inband communication circuit 46 of the external power supply device 40.

The inband communication ECU 32 performs inband communication, and the microcomputer 24 operates the CPLT reception circuit 22 and changes the voltage of logic H in the CPLT signal to 6 V. This can be realized by performing a process such as demodulation on a signal received by the inband communication ECU 32, transmitting the processed signal to the microcomputer 24, and then acknowledging the content of the inband communication with the microcomputer 24.

When an abnormality occurs in inband communication, power may not be transmitted and received. A process of the first embodiment for transmitting and receiving power as long as possible when an abnormality occurs during inband communication will now be described.

Figure 4:
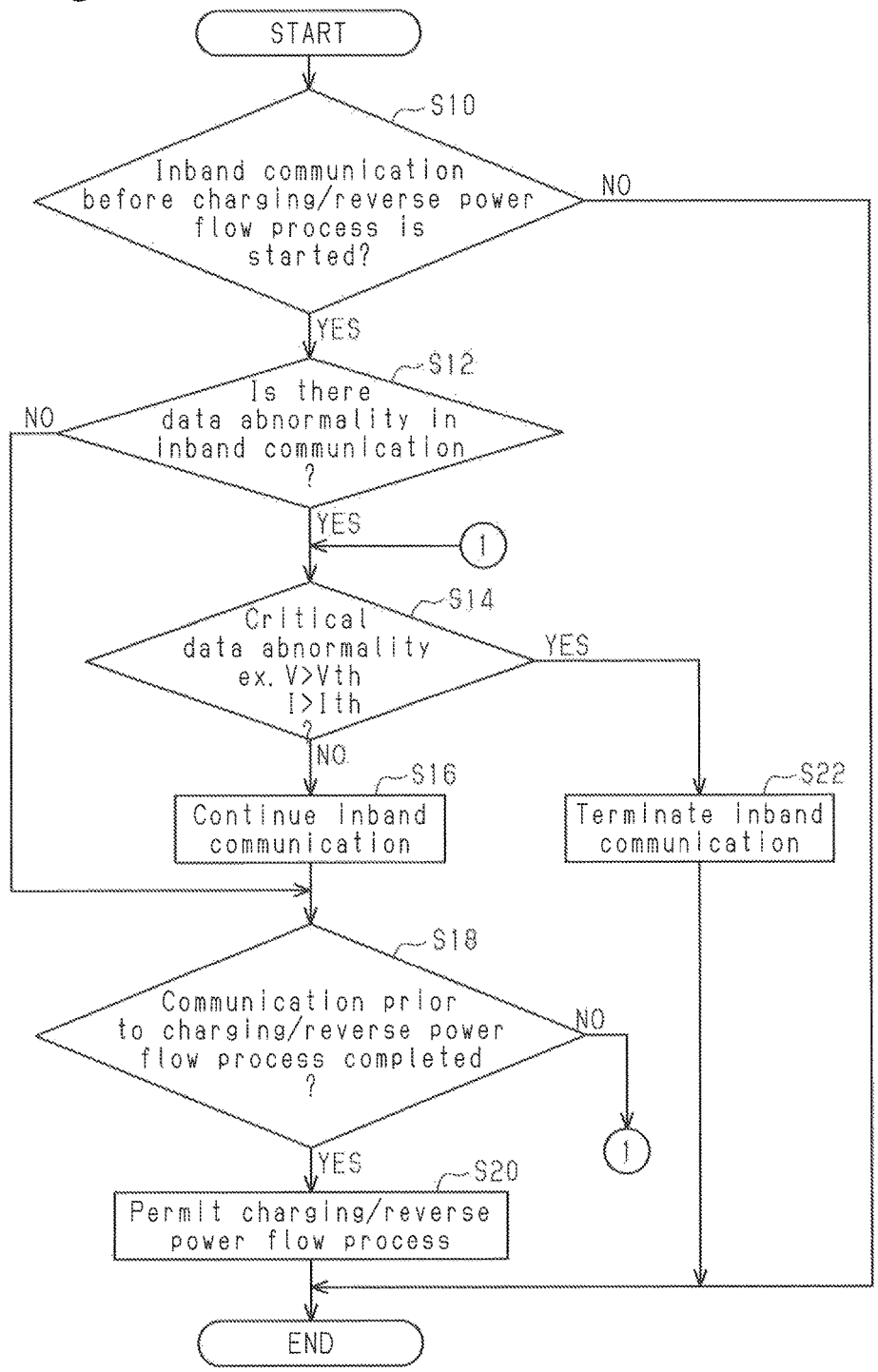
FIG. 4 is a flowchart showing an inband communication process in the first embodiment.

FIG. 4 shows a flowchart of inband communication in the first embodiment. This process is repeatedly performed by the inband communication ECU 32, for example, in predetermined cycles.

In the series of processes shown in FIG. 4, the inband communication ECU 32 first determines whether or not inband communication is being performed on a condition prior to charging or reverse power flow of the battery 12 (S10). In step S10, when making an affirmative determination, the inband communication ECU 32 determines whether or not an abnormality is included in inband communication data (S12). When determining that the inband communication data includes an abnormality (S12: YES), the inband communication ECU 32 determines whether or not the abnormality is a critical data abnormality (S14).

A critical data abnormality refers to an abnormality that does not allow for the execution of the charging process or the reverse power flow of the battery 12 that is the purpose of inband communication. For example, a critical data abnormality is an abnormality in which the value of a physical quantity (for example, applied voltage V or current I) for specifying transmitted and received power is excessively high. For example, when voltage applied from the external power supply device 40 to the vehicle 10 to charge the battery 12 exceeds the withstanding voltage Vth of the converter 14 of the vehicle 10, this indicates that an abnormality in which the battery 12 cannot be charged has occurred. Such a situation occurs when the applied voltage supplied from the external power supply device 40 is not suitable for the converter 14 or when noise mixes with the data transmitted through inband communication from the external power supply device 40 and causes the data to be abnormal. Further, a critical data abnormality does not allow information to be specified and occurs when there is an abnormality in the data indicating whether or not the external power supply device 40 is in correspondence with a reverse power flow or in the data indicating whether charging or reverse power flow can be currently performed. Regarding whether or not the external power supply device 40 is in correspondence with a reverse power flow, a critical abnormality may occur only when inband communication is performed to perform reverse power flow. In addition, a critical data abnormality occurs, for example, when the converter 14 corresponds to only alternating current or direct current, when the external power supply device 40 corresponds to only alternating current or direct current, and when data indicating whether the external power supply device 40 corresponds to alternating current or direct current is abnormal.

A non-critical abnormality refers to an abnormality that allows for the execution of the charging process or the reverse power flow process of the battery 12 that is the purpose of inband communication. For example, a non-critical abnormality includes an abnormality of communication data related with whether or not the Internet can be used through inband communication. The use of the Internet through inband communication is not required for charging or reverse power flow of the battery 12. Further, a non-critical abnormality includes, for example, an abnormality in the data related to information of electric utility rate that is in accordance with the time period. However, when the user instructs the input unit 26 to charge the battery 12 only when the electric utility rate is low, the abnormality is critical. In addition, a non-critical abnormality includes, for example, an abnormality in an identification code (ID) of the external power supply device 40.

When determining that a critical abnormality has not occurred (S14: NO), the inband communication ECU 32 continues inband communication (S16). In this case or when the inband communication ECU 32 makes a negative determination in step S12, the inband communication ECU 32 determines whether or not a communication process performed prior to charging or reverse power flow has been completed (S18). When determining that the communication process performed prior to charging or reverse power flow has not been completed (S18: NO), the inband communication ECU 32 returns to the process of step S14. When determining that the communication process performed prior to charging or reverse power flow has been completed (S18: YES), the inband communication ECU 32 permits the execution of a charging/reverse power flow process (S20).

When determining that a critical data abnormality has occurred (S14: YES), the inband communication ECU 32 terminates inband communication (S22). The inband communication ECU 32 temporarily terminates the series of processes when completing the processes of steps S20 and S22 and when making a negative determination in step S10. In this manner, the inband communication ECU 32 functions as a determination unit that determines whether or not to continue inband communication.

Figure 5:
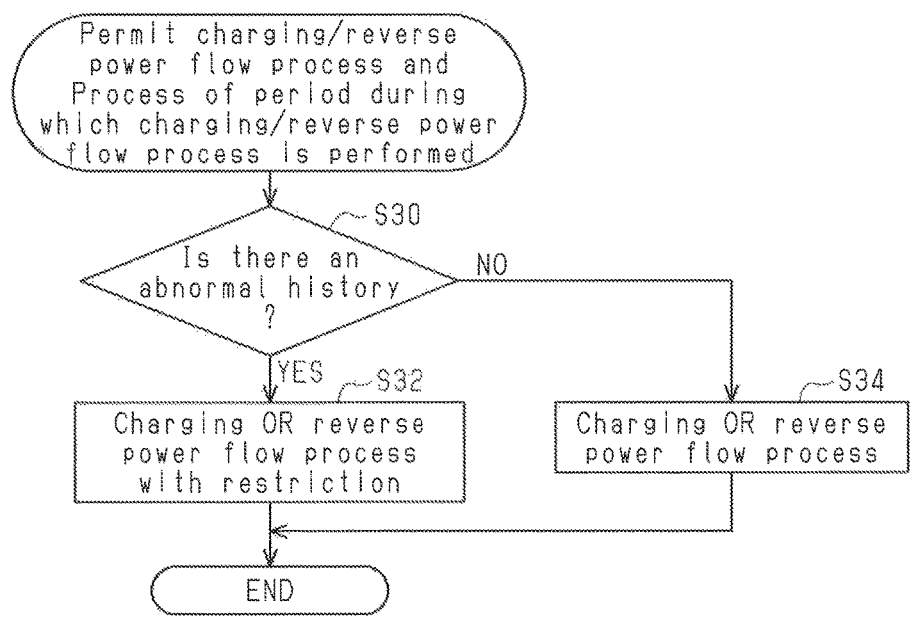
FIG. 5 is a flowchart showing a charging/reverse power flow process in the first embodiment.

FIG. 5 shows a flowchart of the charging/reverse power flow process in the first embodiment. The process is repeatedly performed by the inband communication ECU 32, for example, in predetermined cycles when the process of step S20 permits the charging/reverse power flow process and when the charging/reverse power flow are performed. The period in which charging or reverse power flow is performed is determined by the microcomputer 24 through inband communication. That is, the microcomputer 24 sets a period for charging the battery 12 and discharging the battery 12 based on information such as relationship information of time period and electric utility rate that is acquired through inband communication. When the starting point of a set period greatly differs from the time at which the process of step S20 is completed, the charge control ECU 20, the inband communication ECU 32, and the signal detection ECU 30 wait until the set period reaches in a condition in which power consumption is reduced.

In the series of processes shown in FIG. 5, the inband communication ECU 32 first determines whether or not there is a history indicating that a non-critical data abnormality has occurred, that is, whether or not there is a history indicating that a negative determination has been made in step S14 of FIG. 4 (S30). When determining that there is such a history (S30: YES), the inband communication ECU 32 performs the charging process or the reverse power flow process in the battery 12 within a range of service that is restricted by the data abnormality (S32). For example, when the data abnormality does not allow for the use of the Internet through inband communication, the user cannot use the Internet in the vehicle 10 during the period of the charging process or the reverse power flow process. In addition, when the relationship information of time period and electric utility rate cannot be acquired due to a data abnormality and charging of the battery 12 is immediately started, the charging process cannot be performed at the target time period during which the electric utility rate is low.

When determining that there is no history (S30: NO), the inband communication ECU 32 performs the charging process or the reverse power flow process on the battery 12 while freely receiving the benefit of the service performed through inband communication (S34). When completing the processes of step S32 and S34, the inband communication ECU 32 temporarily terminates the series of processes.

The first embodiment has the advantages described below.

(1) When a data abnormality occurs in inband communication, the inband communication ECU 32 determines whether or not to continue inband communication in accordance with the content of the abnormality (FIG. 4). This avoids a situation in which inband communication is always terminated when a data abnormality occurs in data communication even though charging or reverse power flow can be performed.

(2) As long as a data abnormality allows charging or reverse power flow to be performed, the inband communication ECU 32 determines to continue the communication (S14). This increases the probability that power can be transmitted and received.

(3) When a data abnormality does not allow charging or reverse power flow to be performed, power is transmitted and received within a range in which restriction is not imposed due to the data abnormality (S32). This increases the probability that power can be transmitted and received.

(4) A critical data abnormality includes, for example, data indicating that the applied voltage V and the value of the current I are extremely high and an abnormality in which the information on whether the external power supply device 40 corresponds to direct current or alternating current cannot be properly received. This terminates inband communication when it is not proper to transmit and receive power.

Second Embodiment

A second embodiment will now be described, focusing on differences from the first embodiment, with reference to the drawings.

When a time ratio D of a time of logic H to a cycle time of logic H and logic L of a CPLT signal is greater than or equal to 5%, the time ratio D indicates information of an upper limit value of current that can be output from the external power supply device 40 to the power transmission lines L1 and L2. When the time ratio D of a CPLT signal is greater than or equal to 5%, inband communication cannot be used. However, the external power supply device 40 can supply power of current that is less than or equal to the upper limit value of current acquired by the time ratio D at the set applied voltage. The applied voltage of the external power supply device 40 is acquired when charging is performed using a CPLT signal and is not necessarily equal to an applied voltage that is notified by the external power supply device 40 to the vehicle 10 through inband communication. In particular, the applied voltage when charging is performed using a CPLT signal may be higher than the applied voltage notified by the external power supply device 40 to the vehicle 10 through inband communication. Thus, even when a data abnormality occurs in inband communication, charging with a CPLT signal can be performed as long as the charging is switchable to charging of the battery 12 using a CPLT signal. However, when inband communication is being performed, the vehicle 10 cannot always notify the external power supply device 40 through inband communication to perform charging with a CPLT signal.

Thus, the second embodiment focuses on the fact that when the vehicle 10 does not output a signal through inband communication after the output of a CPLT signal having the time ratio D of 5% to the communication lines L3 and L4, the external power supply device 40 changes the time ratio D of a CPLT signal to a value indicating the upper limit value of charge current when a predetermined time has elapsed. This is based on the grounds that in the ISO 15118-3 standard, the time ratio D is changed to a value indicating the upper limit value of charge current to allow for charging with a CPLT signal when inband communication is not established within a predetermined time from when the output of a CPLT signal having the time ratio D of 5% starts. The problem here is that a data abnormality occurs after inband communication is established.

Thus, in the second embodiment, when a data abnormality occurs in inband communication, a process for returning to a state before communication is started. More specifically, the communication line L3 is intentionally short-circuited so that the external power supply device 40 terminates inband communication. Subsequently, the short-circuited state is cancelled to return to the state before communication is started.

Figure 6:
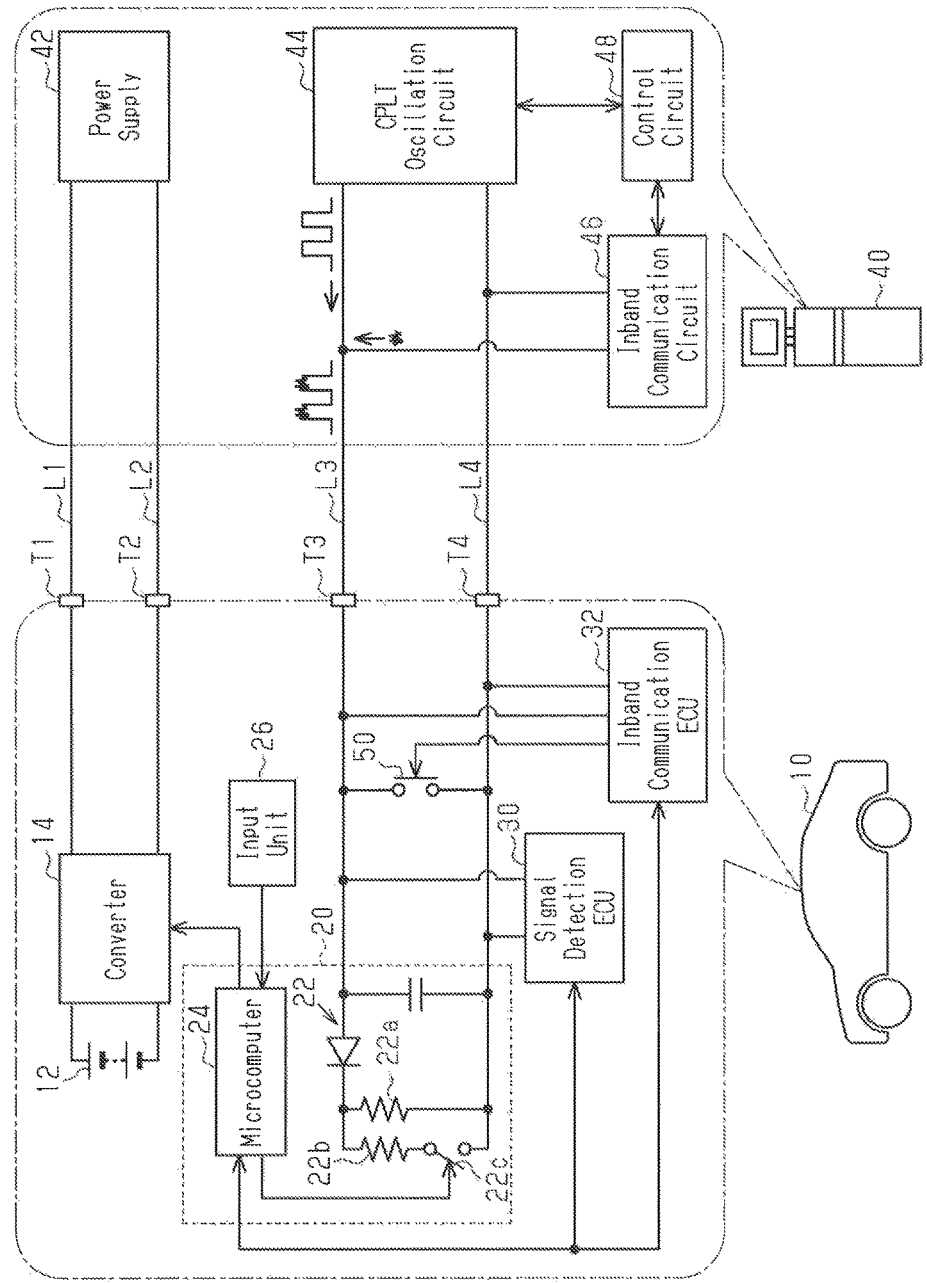
FIG. 6 is a diagram showing the system configuration of a second embodiment.

FIG. 6 shows a system configuration of the second embodiment. In FIG. 6, like or same reference numerals are given to those components that are the same as the corresponding components of FIG. 1.

As shown in FIG. 6, the second embodiment includes a relay 50 that is arranged between the communication lines L3 and L4. The relay 50 can be opened and closed by the inband communication ECU 32. When the relay 50 is closed, a state that is the same when the communication line L3 is short-circuited to ground, that is, voltage of the communication line L3 is fixed at 0 V, is produced. In this manner, when an abnormality occurs in inband communication, the inband communication ECU 32 performs a voltage change operation that changes the voltage of the communication line L3 to a voltage that differs from the voltage (in this example, 9 V) when inband communication is normally performed.

Figure 7:
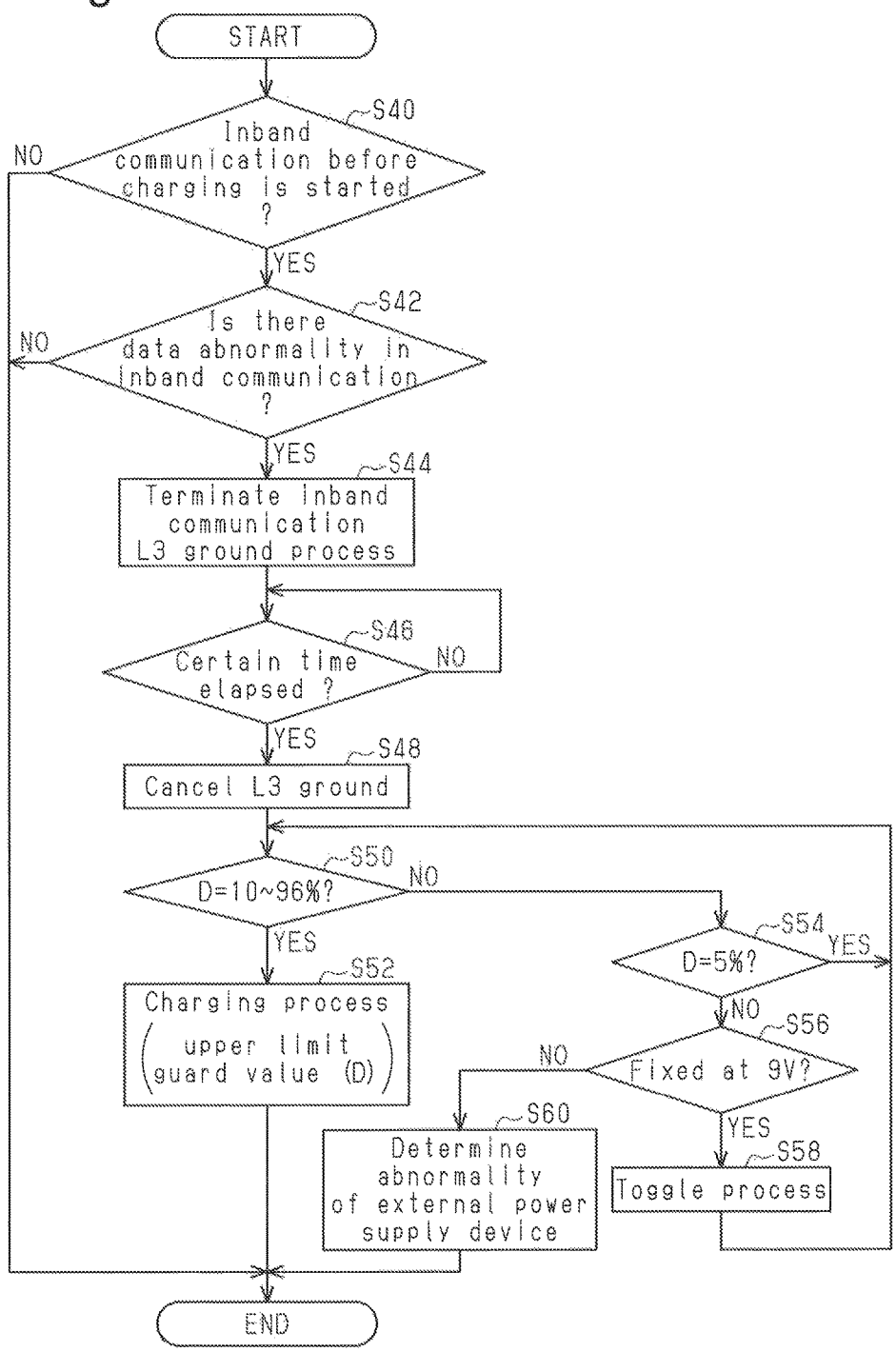
FIG. 7 is a flowchart showing a fail-safe process in the second embodiment.

FIG. 7 shows a flowchart showing a fail-safe process when data is abnormal in the second embodiment. This process is repeatedly performed by the inband communication ECU 32, for example, in predetermined cycles.

In the series of processes shown in FIG. 7, the inband communication ECU 32 first determines whether or not inband communication is being performed and whether or not the content of the communication is for a condition before charging of the battery 12 starts (S40). When determining a condition prior to charging (S40: YES), the inband communication ECU 32 determines whether or not a data abnormality has occurred in inband communication (S42). When determining that a data abnormality has occurred in inband communication (S42: YES), the inband communication ECU 32 terminates inband communication and closes the relay 50 to perform a L3 ground process so that the communication line L3 is short-circuited to the communication line L4 (S44). Then, the inband communication ECU 32 waits for a certain time on a condition in which the communication line L3 is short-circuited to the communication line L4 (S46: NO). The certain time is set to be greater than or equal to the time for the external power supply device 40 to determine that an abnormality in which the communication line L3 is short-circuited to the ground has occurred and to terminate inband communication. It is desired that the time be greater than or equal to a time for the external power supply device 40 to terminate inband communication and be minimized.

When a certain time elapses (S46: YES), the inband communication ECU 32 opens the relay 50 to stop the ground process and cancel the state in which the communication line L3 is short-circuited to the ground (S48: ground cancellation). Then, the inband communication ECU 32 determines whether or not a CPLT signal is output to the communication line L3 and the time ratio D is 10% to 96% (S50). This process is performed for determining whether or not the battery 12 can be charged using a CPLT signal. Subsequently, when determining that the time ratio D is 10% to 96% (S50: YES), the inband communication ECU 32 performs the charging process of the battery 12 (S52). In this process, the charging process is performed while setting the upper limit value of charge current of the battery 12 to a value defined by the time ratio D. More specifically, the converter 14 is operated to control charge current so that the amount of current pulled from the power supply 42 becomes less than or equal to the upper limit defined by the time ratio D.

When determining that the time ratio D is not 10% to 96% (S50: NO), the inband communication ECU 32 determines whether or not the time ratio D is 5% (S54). This process is performed for determining whether or not the external power supply device 40 is urging for inband communication. When determining that the time ratio D is 5% (S54: YES), the inband communication ECU 32 returns to step S50 without performing inband communication and waits until the time ratio D becomes 10% to 96%. When determining that the time ratio D is not 5% (S54: NO), the inband communication ECU 32 determines whether or not the voltage of the communication line L3 is fixed at 9 V (S56). This process is performed for determining whether or not the external power supply device 40 terminates inband communication due to an abnormality in inband communication and then stops outputting a CPLT signal. Subsequently, when determining that the voltage of the communication line L3 is fixed at 9 V (S56: YES), the inband communication ECU 32 performs a toggle process that instructs the external power supply device 40 to start outputting a CPLT signal (S58). More specifically, the switching element 22*c* is closed and then opened again to decrease the voltage of the communication line L3 to 6 V and subsequently return the voltage to 9 V. After performing the toggle process, the inband communication ECU 32 returns to the process of step S50.

When determining that the voltage of the communication line L3 is not fixed at 9 V (S56: NO), the inband communication ECU 32 determines an abnormality of the external power supply device 40 (S60). When completing the processes of steps S52 and S60 and making a negative determination in steps S40 and S42, the inband communication ECU 32 temporarily terminates the series of processes.

The second embodiment has the advantages described below.

(5) When a data abnormality occurs in inband communication, the inband communication ECU 32 intentionally short-circuits the communication line L3 to ground (S44) and cancels the short-circuited state after a certain time elapses (S48). Thus, the external power supply device 40 recognizes that an abnormality in which inband communication cannot be performed occurs and terminates inband communication. This allows for quick shifting to a state before inband communication is started.

(6) When the time ratio D of a CPLT signal output to the communication line L3 is 5% after cancelling the state in which the communication line L3 is short-circuited to the ground, the inband communication ECU 32 waits without performing inband communication (S54). This allows the external power supply device 40 to shift to a state in which charging can be performed using a CPLT signal.

(7) When a CPLT signal is not output to the communication line L3 after cancelling the state in which the communication line L3 is short-circuited to the ground, the inband communication ECU 32 performs the toggle process that urges for the output of a CPLT signal (S58). This resumes the output of the CPLT signal.

Third Embodiment

A third embodiment will now be described, focusing on differences from the second embodiment, with reference to the drawings.

In the second embodiment, the inband communication ECU 32 intentionally sets the external power supply device 40 to an abnormal state in which communication cannot be performed to terminate inband communication. In the third embodiment, the inband communication ECU 32 stops transmitting a request signal so that the external power supply device 40 terminates inband communication. This process does not require a special hardware means. Thus, the third embodiment has the same system configuration as that shown in FIG. 1.

Figure 8:
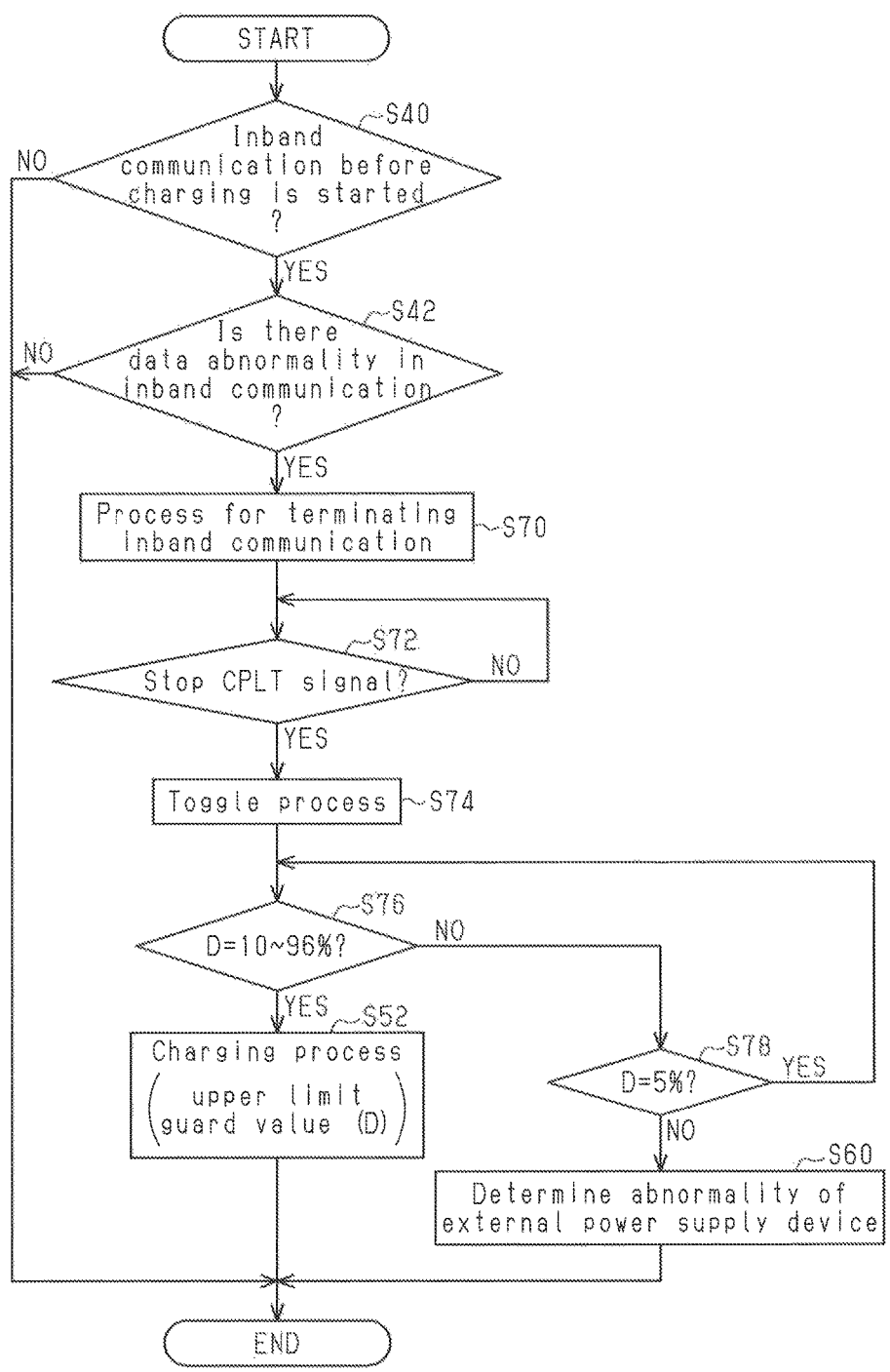
FIG. 8 is a flowchart showing a fail-safe process in a third embodiment.

FIG. 8 shows a flowchart showing a fail-safe process when data is abnormal in the third embodiment. This process is repeatedly performed by the inband communication ECU 32, for example, in predetermined cycles. In FIG. 8, the same step numbers are given to the processes corresponding to those shown in FIG. 7.

In the series of processes shown in FIG. 8, when making an affirmative determination in step S42, the inband communication ECU 32 performs a process for terminating inband communication (S70). More specifically, the inband communication ECU 32 stops transmitting a request signal. This may be performed by interrupting the power supply of a modem in the inband communication ECU 32 that is used for inband communication. Alternatively, the transmission of a request signal may just be stopped without interrupting the power supply of the modem. The inband communication ECU 32 waits until outputting of a CPLT signal is stopped (S72: NO). When the output of a CPLT signal is stopped (S72: YES), the inband communication ECU 32 performs a toggle process in the same manner as the process of step S58 shown in FIG. 7 (S74). When a CPLT signal is output to the communication line L3, the inband communication ECU 32 determines whether or not the time ratio D of a CPLT signal is 10% to 96% (S76). When determining that the time ratio D is 10% to 96% (S76: YES), the inband communication ECU 32 proceeds to step S52.

When determining that the time ratio D is not 10% to 96% (S76: NO), the inband communication ECU 32 determines whether or not the time ratio D is 5% (S78). When determining that the time ratio is 5% (S78: YES), the inband communication ECU 32 returns to the process of step S76 to wait until the inband communication ECU 32 shifts to a state in which charging can be performed using a CPLT signal without performing inband communication. When determining that the time ratio D is not 5% (S78: NO), the inband communication ECU 32 determines that the external power supply device 40 includes an abnormality (S60).

The inband communication ECU 32 temporarily terminates the series of processes when completing the processes of steps S52 and S60 and making a negative determination in steps S40 and S42.

The third embodiment has the advantages described below.

(8) When a data abnormality occurs, the inband communication ECU 32 stops transmitting a request signal (S70). This allows the external power supply device 40 to terminate inband communication since inband communication cannot be performed.

(9) When a CPLT signal is not output to the communication line L3, the inband communication ECU 32 performs the toggle process (S74). This allows the external power supply device 40 to shift to a state in which a CPLT signal is transmitted to the communication line L3.

As a result of the toggle process, when the time ratio D of a CPLT signal that starts to be output is 5%, the inband communication ECU 32 waits without performing inband communication (S78: YES). This allows the external power supply device 40 to recognize that inband communication cannot be performed and to shift to a state in which charging can be performed using a CPLT signal.

Fourth Embodiment

A fourth embodiment will now be described, focusing on differences from the third embodiment, with reference to the drawings.

Figure 9:
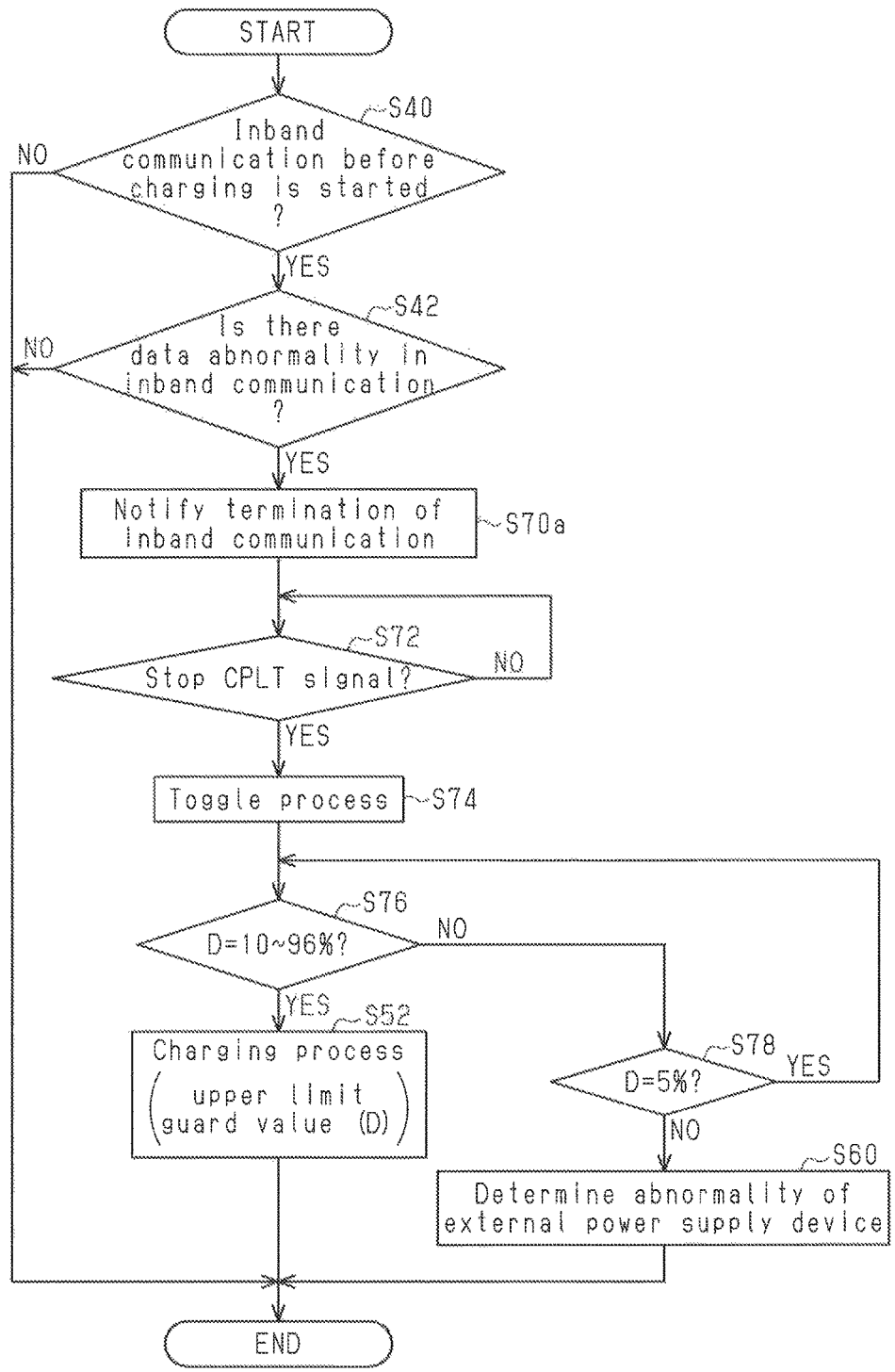
FIG. 9 is a flowchart showing a fail-safe process in a fourth embodiment.

FIG. 9 shows a flowchart showing a fail-safe process when data is abnormal in the fourth embodiment. This process is repeatedly performed by the inband communication ECU 32, for example, in predetermined cycles. In FIG. 9, the same step numbers are given to the processes corresponding to those shown in FIG. 8.

In the series of processes shown in FIG. 9, when making an affirmative determination in step S42, the inband communication ECU 32 notifies the external power supply device 40 to terminate inband communication (S70a). That is, a high-frequency signal superimposed on a CPLT signal includes information for terminating inband communication. In the same manner as the process in FIG. 8, the inband communication ECU 32 waits until the output of the CPLT signal is stopped (S72).

In addition to advantages (9) and (10) of the third embodiment, the fourth embodiment has the advantage described below.

(11) When a data abnormality occurs, the inband communication ECU 32 uses inband communication to notify the external power supply device 40 to terminate inband communication (S70a). This allows the external power supply device 40 to terminate inband communication.

Fifth Embodiment

A fifth embodiment will now be described, focusing on differences from the third embodiment, with reference to the drawings.

Figure 10:
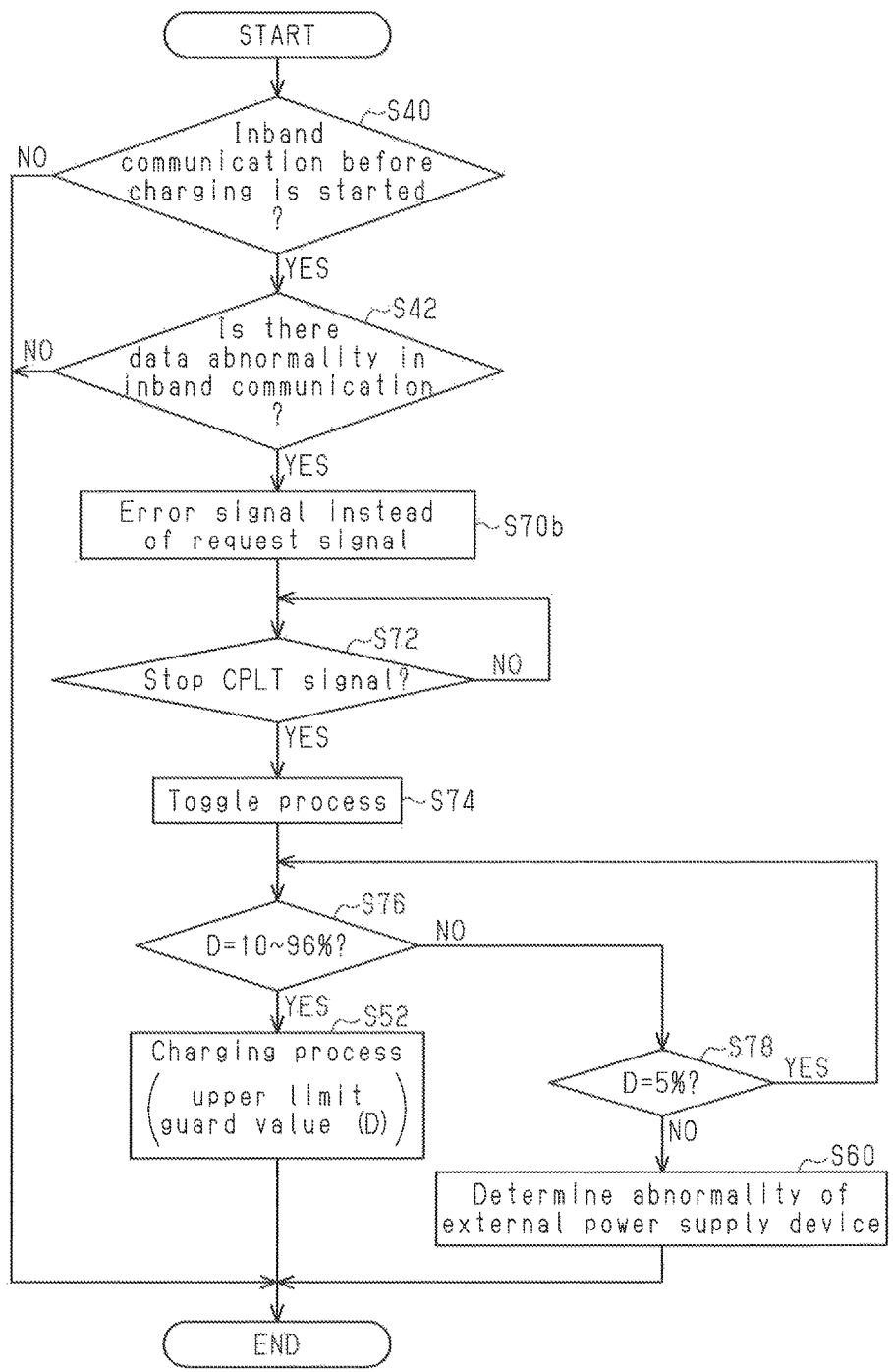
FIG. 10 is a flowchart showing a fail-safe process in a fifth embodiment.

FIG. 10 shows a flowchart showing a fail-safe process when data is abnormal in the fifth embodiment. This process is repeatedly performed by the inband communication ECU 32, for example, in predetermined cycles. In FIG. 10, the same step numbers are given to the processes corresponding to those shown in FIG. 8.

In the series of processes shown in FIG. 10, when making an affirmative determination in step S42, the inband communication ECU 32 intentionally transmits a signal that differs from a signal that should be transmitted, that is, an error signal that is determined as being abnormal by the external power supply device 40, instead of a request signal. This process is performed so that the external power supply device 40 recognizes that an abnormality has occurred in inband communication and terminates inband communication. In the same manner as the process shown in FIG. 8, the inband communication ECU 32 waits until the output of a CPLT signal is stopped (S72).

In addition to advantages (9) and (10) of the third embodiment, the fifth embodiment has the advantage described below.

(12) When a data abnormality occurs, the inband communication ECU 32 intentionally transmits a request signal as an error signal (S70b). This allows the external power supply device 40 to terminate inband communication since inband communication cannot be performed.

Sixth Embodiment

A sixth embodiment will now be described, focusing on differences from the first embodiment, with reference to the drawings.

In the first embodiment, when determining that a data abnormality is critical, the inband communication ECU 32 terminates inband communication and does not perform the charging process. However, even when a critical abnormality occurs in inband communication, the battery 12 may be charged using a CPLT signal in the manners exemplified in the second to fifth embodiments. That is, in the charging process using a CPLT signal, the time ratio D of a CPLT signal allows the inband communication ECU 32 to acquire information of an upper limit value of charge current. Further, in the charging process using a CPLT signal, an applied voltage supplied from the external power supply device 40 to the vehicle 10 is set in advance. Thus, even when a critical abnormality means that the applied voltage supplied from the external power supply device 40 to the vehicle 10 in the charging process using a CPLT signal exceeds the withstanding voltage of the converter 14 or the like, charging can be performed using a CPLT signal. Accordingly, in the sixth embodiment, when inband communication is started to charge the battery 12 and then a critical abnormality occurs, charging is performed using a CPLT signal.

Figure 11:
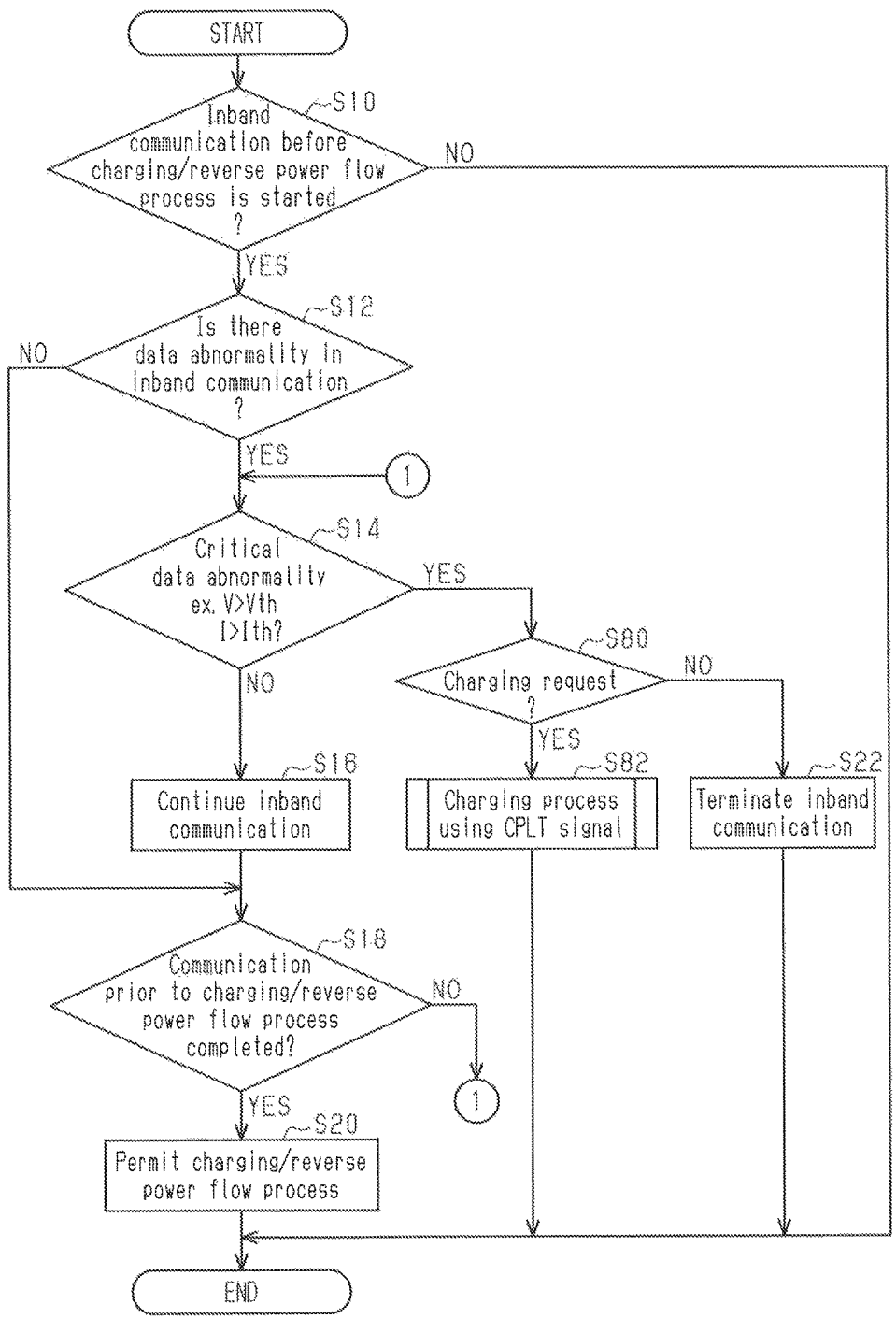
FIG. 11 is a flowchart showing an inband communication process in a sixth embodiment.

FIG. 11 shows a flowchart showing a fail-safe process when data is abnormal in the sixth embodiment. This process is repeatedly performed by the inband communication ECU 32, for example, in predetermined cycles. In FIG. 11, the same step numbers are given to the processes corresponding to those shown in FIG. 4.

In the series of processes shown in FIG. 11, when determining that a critical abnormality has occurred (S14: YES), the inband communication ECU 32 determines whether or not inband communication has been performed to charge the battery 12 (S80). This process is performed for determining whether or not to proceed to a charging process using a CPLT signal. When determining that inband communication has been performed to charge the battery 12 (S80: YES), the inband communication ECU 32 performs any of the processes shown in FIGS. 7 to 10 to perform the charging process using a CPLT signal (S82). When inband communication has been performed to perform reverse power flow (S80: NO), the inband communication ECU 32 returns to the process of step S22 since the reverse power flow process cannot be performed using a CPLT signal.

The correspondence relationship of the constituting elements described in MEANS FOR SOLVING THE PROBLEM and those in the above embodiments will now be described below.

External power supply device: 40
On-vehicle power storage device: 12
Communication unit: 32
Determination unit: 32
Bidirectional communication: Inband communication
Execution unit: 32
Information of current value: Information included in time ratio D
Acquisition unit: 30
Communication line: L3, L4
Termination processor: 32
Charging processor: 32
Logic signal: CPLT signal
Urging unit: 32

Other Embodiments

Each of the above embodiments may be modified as described below.

In the second embodiment, when an abnormality occurs in inband communication, the inband communication ECU 32 performs the voltage change operation that changes the voltage of the communication line L3 to a voltage that differs from the voltage (in this example, 9 V) when inband communication (bidirectional communication) is normally performed. More specifically, the inband communication ECU 32 fixes the voltage of the communication line L3 at 0 V.

In such a voltage change operation, the inband communication ECU 32 may fix the voltage of the communication line L3 at −12 V. Since logic L of a CPLT signal is −12 V, when the voltage of the communication line L3 is fixed at −12 V, the external power supply device 40 may determine that an abnormality of short-circuiting in a voltage source of logic L of the CPLT oscillation circuit 44 and the communication line L3 has occurred and then terminate inband communication. Subsequently, the inband communication ECU 32 returns the voltage of the communication line L3 to normal voltage, that is, 9 V, to have the external power supply device 40 re-perform the oscillation start process of a CPLT signal. Further, since a state in which an abnormality has occurred in the communication line L3 is produced, the fixed value of voltage does not have to be 0 V or −12 V.

In addition, the voltage of the communication line L3 does not have to be fixed. For example, the voltage of the communication line L3 may be cyclically set to 0 V during a period that is shorter than a cycle time of a CPLT signal and contains logic H of a CPLT signal. In this case, since the voltage of the communication line L3 cyclically changes between −12 V and 0 V, the external power supply device 40 determines that an abnormality has occurred in communication.

In each of the above embodiments, the inband communication ECU 32 functions as a termination processor that performs a process for terminating inband communication.

Instead, the microcomputer 24 may function as a termination processor. For example, a switching element is connected in series to the resistor 22a between the terminals T3 and T4. The microcomputer 24 closes the switching element when detecting that the communication lines L3 and L4 are connected to each other, and the microcomputer 24 opens the switching element when an abnormality occurs in inband communication. In this case, since the voltage of the communication line L3 increases to 12 V when the switching element is open, the external power supply device 40 determines that the communication lines L3 and L4 have been disconnected from each other. Thus, when the switching element is subsequently closed, the external power supply device 40 determines that the communication lines L3 and L4 have been connected again. This allows the external power supply device 40 to re-perform the oscillation start process of a CPLT signal.

Further, the process for terminating inband communication does not have to be performed with the communication lines L3 and L4 connected to each other. For example, the process may be performed to notify a user to temporarily disconnect the communication lines L3 and L4 and then connect the communication lines L3 and L4 again. When the user temporarily disconnects the communication lines L3 and L4 from each other and then connects the communication lines L3 and L4 again, a CPLT signal having the time ratio of 5% is oscillated. In such a case, the inband communication ECU 32 may wait without transmitting a signal of inband communication until the time ratio D is changed.

The process that is performed after the inband communication ECU 32 (or microcomputer 24) serving as a termination processor terminates inband communication is not limited to the process described in each of the above embodiments.

For example, in the fourth embodiment (FIG. 9), after the inband communication ECU 32 notifies the external power supply device 40 that the inband communication is terminated, the processes subsequent to step S70a may be changed to the processes of steps S50 and S60 in FIG. 7 so that the external power supply device 40 continues to transmit a CPLT signal while terminating inband communication.

In each of the above embodiments, the inband communication ECU 32 functions as a determination unit that determines whether or not to continue inband communication.

For example, in the first embodiment, when the voltage V applied to the power transmission line L1 and the current I supplied through the power transmission line L1 are excessively high, the inband communication ECU 32 terminates inband communication since a critical abnormality has occurred. However, for example, when the applied voltage V and the current I are excessively low, the inband communication ECU 32 may determine that a signal output from the external power supply device 40 has low reliability and then determine that a critical abnormality has occurred. Further, for example, when a fee according to the amount of power usage is withdrawn from a pre-registered account based on user authentication, an abnormality may occur in communication related to user authentication. In such a case, the inband communication ECU 32 may determine that a critical abnormality has occurred and then terminate inband communication. This avoids a situation in which inband communication is continued although a critical abnormality has occurred and power supply from the external power supply device 40 is forcibly stopped after operating the converter 14 to start a charging process.

The communication for transmitting and receiving power is not limited to inband communication. Instead, for example, when an abnormality occurs in communication related to additional services, the process of charging the battery 12 and the process of supplying power of the battery 12 to the outside (reverse power flow process) may be performed within a range in which the services are not received.

In addition, when a first communication mode including additional services and a second communication mode that enables minimum charging are switchable in the same communication line, a signal of the second communication mode does not have to be superposed on a signal of the first communication mode. That is, even when a signal of the second communication mode is not superposed on a signal of the first communication mode, a process for proceeding to the second communication mode can be performed when an abnormality occurs in the first transmission mode in accordance with the manners of the second to sixth embodiments.

Some or all of the processes shown in FIGS. 4 to 11 may be performed by the charge control ECU 20.

The signal detection ECU 30 and the inband communication ECU 32 may be formed on the same substrate. Further, the CPLT reception circuit 22 may be formed on a substrate that differs from the substrate on which the charge control ECU 20 is formed. In this case, the CPLT reception circuit 22 may be formed on the same substrate as the signal detection ECU 30 and the inband communication ECU 32. In addition, the charge control ECU 20, the signal detection ECU 30, and the inband communication ECU 32 may be formed on a single substrate. In this case, when the microcomputer is shared, communication (for example, CAN communication) is not required between a functional unit realized by the charge control ECU 20, a functional unit realized by the signal detection ECU 30, and a functional unit realized by the inband communication ECU 32.

The invention claimed is:

1. A vehicle power transmitting and receiving control device applied to a vehicle, the vehicle including an on-vehicle power storage device that transmits and receives power to and from an external power supply device and a communication unit that performs bidirectional communication to transmit and receive the power, wherein the bidirectional communication is performed through a communication line that is independent from a line for transmitting and receiving the power and the bidirectional communication includes communication for preparing for the transmission and reception of the power before transmitting and receiving the power, the vehicle power transmitting and receiving control device comprising:
   a determination unit that determines, when an abnormality occurs in the bidirectional communication performed before transmitting and receiving the power, whether or not to continue the bidirectional communication in accordance with a content of the abnormality, wherein the bidirectional communication is performed by superposing a high-frequency signal on a logic signal in which logic H and logic L appear alternately when a time ratio of a time of logic H to a cycle time including a period of logic H and a period of logic L in the logic signal becomes a predetermined ratio, when the time ratio does not become the predetermined ratio, the time ratio indicates information of a current value output from the external power supply device when the external power supply device supplies power to the on-vehicle power storage device, and the determination unit determines to continue the bidirectional communication on the condition that the content of the abnormality allows for transmission and reception of the power; and an execution unit that performs transmission and reception of the power within a range in which a service restriction is imposed in accordance with the content of the abnormality of the bidirectional communication when the determination unit determines to continue the bidirectional communication.

2. The vehicle power transmitting and receiving control device according to claim 1, wherein the determination unit determines not to continue the bidirectional communication when the content of the abnormality hinders transmission and reception of the power.

3. The vehicle power transmitting and receiving control device according to claim 1, comprising:

an acquisition unit that acquires the information of the current value output from the external power supply device;

a termination processor that performs a process for having the external power supply device terminate the bidirectional communication so that the external power supply device outputs the information of the current value when the determination unit determines not to continue the bidirectional communication while performing the bidirectional communication to charge the on-vehicle power storage device with the power supplied from the external power supply device; and a charging processor that charges the on-vehicle power storage device based on the information of the current value acquired by the acquisition unit after the process for termination performed by the termination processor.

4. The vehicle power transmitting and receiving control device according to claim 3, wherein the termination processor performs a voltage change operation, as the process for termination, to change voltage of the communication line to a voltage that differs from when the bidirectional communication is performed normally and then performs a process for stopping the voltage change operation.

5. The vehicle power transmitting and receiving control device according to claim 4, wherein the vehicle power transmitting and receiving control device comprises a waiting processor that waits without performing the bidirectional communication when the logic signal is transmitted from the external power supply device and the time ratio of the logic signal is the predetermined ratio after the termination processor stops the voltage change operation, wherein when the time ratio is the predetermined ratio, the logic signal does not include the information of the current value, and the charging processor starts to charge the on-vehicle power storage device on the condition that the information of the current value is transmitted from the external power supply device as a result of the waiting of the waiting processor.

6. The vehicle power transmitting and receiving control device according to claim 4, wherein the vehicle power transmitting and receiving control device comprises an urging unit that urges for transmission of the logic signal when the logic signal is not transmitted after the termination processor stops the voltage change operation.

7. The vehicle power transmitting and receiving control device according to claim 3, wherein the termination processor performs a process, as the process for termination, for notifying the external power supply device using the bidirectional communication that the bidirectional communication will be terminated.

8. The vehicle power transmitting and receiving control device according to claim 3, wherein the bidirectional communication includes transmitting a request signal from the communication unit and then transmitting a response signal from the external power supply device, and the termination processor performs a process, as the process for termination, for stopping transmission of the request signal.

9. The vehicle power transmitting and receiving control device according to claim 3, wherein the bidirectional communication includes transmitting a request signal from the communication unit and then transmitting a response signal from the external power supply device, and the termination processor performs a process, as the process for termination, for transmitting an abnormal signal as the request signal.

10. The vehicle power transmitting and receiving control device according to claim 7, wherein the vehicle power transmitting and receiving control device comprises an urging unit that urges for transmission of the logic signal on the condition that the logic signal is not transmitted to the communication line after the process for termination performed by the termination processor.

11. The vehicle power transmitting and receiving control device according to claim 7, wherein when the time ratio becomes the predetermined ratio, the logic signal does not include the information of the current value, and the vehicle power transmitting and receiving control device comprises a waiting processor that waits without performing the bidirectional communication when the external power supply device transmits the logic signal and the time ratio of the logic signal is the predetermined time ratio.

12. A vehicle power transmitting and receiving control device applied to a vehicle, the vehicle including an on-vehicle power storage device that transmits and receives power to and from an external power supply device and a communication unit that performs bidirectional communication to transmit and receive the power, wherein the bidirectional communication is performed through a communication line that is independent from a line for transmitting and receiving the power, the vehicle power transmitting and receiving control device comprising:

an acquisition unit that acquires, through the communication line that is used for the bidirectional communication, information of a current value output from the external power supply device when power is supplied from the external power supply device to the on-vehicle power storage device, wherein
the bidirectional communication includes communication for preparing for the transmission and reception of the power before transmitting and receiving the power;
a termination processor that performs a process for having the external power supply device terminate the bidirectional communication so that the external power supply device outputs the information of the current value on the condition that an abnormality occurs in the bidirectional communication performed before transmitting and receiving the power; and
a charging processor that charges the on-vehicle power storage device based on the information of the current value acquired by the acquisition unit after the process performed by the termination processor.

13. The vehicle power transmitting and receiving control device according to claim 12, wherein the termination processor performs a voltage change operation, as the process for termination, to change voltage of the communication line to a voltage that differs from when the bidirectional communication is performed normally and then performs a process for stopping the voltage change operation.

14. The vehicle power transmitting and receiving control device according to claim 13, wherein
the information of the current value is expressed by a time ratio of a time of logic H to a cycle time including a period of logic H and a period of logic L in a logic signal in which logic H and logic L appear alternately,
the bidirectional communication is performed by superposing a high-frequency signal on the logic signal when the time ratio becomes a predetermined ratio, and
the vehicle power transmitting and receiving control device comprises a waiting processor that waits without performing the bidirectional communication when the logic signal is transmitted from the external power supply device and the time ratio of the logic signal is the predetermined ratio after the termination processor stops the voltage change operation, wherein
when the time ratio is the predetermined ratio, the logic signal does not include the information of the current value, and
the charging processor starts to charge the on-vehicle power storage device on the condition that the information of the current value is transmitted from the external power supply device as a result of the waiting of the waiting processor.

15. The vehicle power transmitting and receiving control device according to claim 13, wherein
the information of the current value is expressed by a time ratio of a time of logic H to a cycle time including a period of logic H and a period of logic L in a logic signal in which logic H and logic L appear alternately,
the bidirectional communication is performed by superposing a high-frequency signal on the logic signal when the time ratio becomes a predetermined ratio, and
the vehicle power transmitting and receiving control device comprises an urging unit that urges for transmission of the logic signal when the logic signal is not transmitted after the termination processor stops the voltage change operation.

16. The vehicle power transmitting and receiving control device according to claim 12, wherein the termination processor performs a process, as the process for termination, for notifying the external power supply device using the bidirectional communication that the bidirectional communication will be terminated.

17. The vehicle power transmitting and receiving control device according to claim 12, wherein
the bidirectional communication includes transmitting a request signal from the communication unit and then transmitting a response signal from the external power supply device, and
the termination processor performs a process, as the process for termination, for stopping transmission of the request signal.

18. The vehicle power transmitting and receiving control device according to claim 12, wherein
the bidirectional communication includes transmitting a request signal from the communication unit and then transmitting a response signal from the external power supply device, and
the termination processor performs a process, as the process for termination, for transmitting an abnormal signal as the request signal.

* * * * *